AUTOMATIC FREQUENCY CONTROL CIRCUIT

Filed Feb. 2, 1950 2 Sheets-Sheet 1

INVENTOR.
NORMAN W. PARKER
BY Alden D. Redfield
Charles M. Hogan
ATTORNEYS

July 24, 1951 N. W. PARKER 2,561,817

AUTOMATIC FREQUENCY CONTROL CIRCUIT

Filed Feb. 2, 1950 2 Sheets-Sheet 2

INVENTOR.
NORMAN W. PARKER
BY
Alden D. Redfield
Charles M. Hogan
ATTORNEYS

Patented July 24, 1951 2,561,817

UNITED STATES PATENT OFFICE 2,561,817

AUTOMATIC FREQUENCY CONTROL CIRCUIT

Norman W. Parker, Cincinnati, Ohio, assignor to Avco Manufacturing Corporation, Cincinnati, Ohio, a corporation of Delaware Application February 2, 1950, Serial No. 141,942

14 Claims. (Cl. 315—27)

Figure 1:
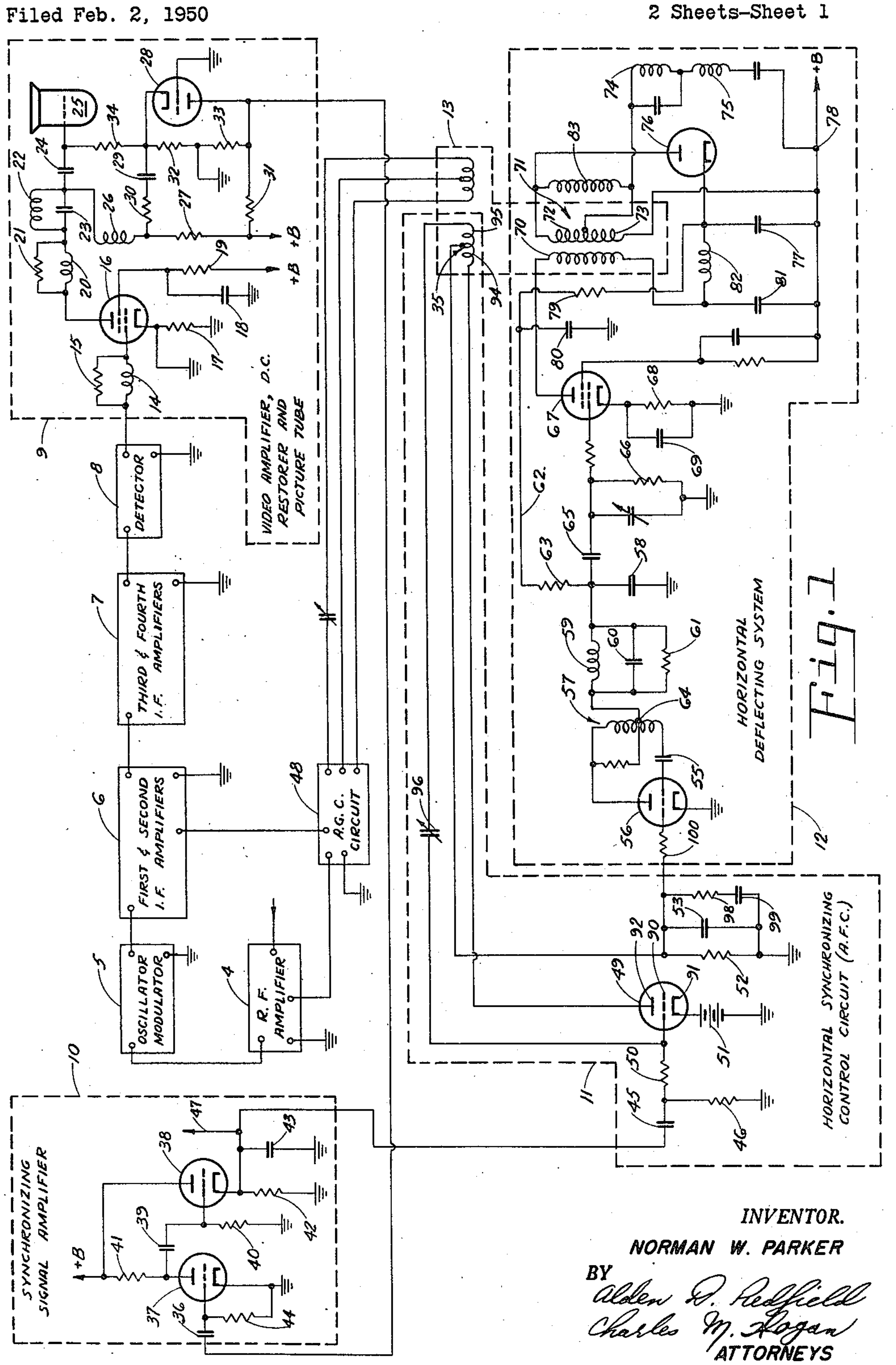

The present invention relates to improvements in automatic frequency control or synchronizing control systems and specifically to a novel indirect synchronizing system of particular utility in controlling the horizontal deflecting system of a television receiver. The invention also embraces novel means and methods for producing control pulses for such a system.

The prior art embraces various types of automatic synchronizing control circuits which possess known advantages over directly triggered deflecting systems. Three of the more popular circuits are described in an article by E. L. Clark, Automatic Frequency Phase Control of Television Sweep Circuits, Proceedings of the I. R. E., pp. 497 et seq., vol. 37, No. 5, May 1949, The Institute of Radio Engineers, New York, New York.

The flywheel or synchrolock automatic frequency control (AFC) system utilizes a sine-wave oscillator to control the discharge tube, includes a discriminator comprising a pair of diodes to compare the phases of the sine-wave signals and the horizontal synchronizing signals, thereby to derive a D. C. control potential, and applies the control potential to a reactance tube to accomplish synchronism by governing the frequency of the sine-wave oscillator. This system is fully described in U. S. Patent No. 2,460,112 to Anthony Wright and Edwin L. Clark, and at pp. 335–339, Basic Television-Principles and Servicing, Bernard Grob, first edition, McGraw-Hill Book Co., New York, New York, 1949, also at pages 294–296, Television Simplified, Milton S. Kiver, second edition, D. Van Nostrand Co., Inc., New York, New York, 1949, and at pages 101–105, Photofact Television Course, first edition, Howard W. Sams Co., Inc., 1949, Indianapolis, Indiana. The flywheel system gives favorable results by comparison with directly synchronized deflecting systems but it utilizes five tubes to perform the functions of horizontal discharge and AFC control: one for sine-wave generation, two for discrimination, one for reactance control and one for horizontal discharge. The flywheel system employs four tubes for its AFC function. A primary object of the present invention is to provide an automatic synchronizing control circuit which requires only one tube for the performance of this function.

The sawtooth type of AFC circuit utilizes the horizontal synchronizing pulses to key into conductivity a pair of diodes included in a phase detector. This detector compares the phase of sawtooth signals, derived from the horizontal output, and the synchronizing pulses thereby to develop a D. C. control potential. This control potential is amplified and applied to a blocking oscillator to synchronize the horizontal deflecting system. The sawtooth system is described at pages 339, 340 of the Grob publication and pages 497, 498 of the Clark article and in U. S. Patent 2,358,545 to Wendt. The sawtooth system also represents an improvement over directly synchronized systems. A disadvantage and limitation is introduced by the necessity of employing a direct current (D. C.) amplifier in order to produce an adequate AFC potential. The sawtooth system uses three tubes for the AFC function: two diodes for phase detection and a triode or equivalent for D. C. amplification. Another basic object of the present invention is to provide a system of high gain, without resort to D. C. amplification, while reducing the number of required tubes.

As stated in the Clark article, the third system, variously known as synchroguide, pulse width control or pulse-time system uses the least number of tubes of the three systems. Synchroguide is described at pages 83–84 of the Sams publication, page 499 of the Clark article, and pages 340–341 of the Grob work. In this system three different voltages are applied to the grid of the control tube; the horizontal synchronizing pulses, flyback pulses from the output transformer and parabolic pulses which are obtained by integrating the sawtooth output at the discharge capacitor. The plate current of the control tube consists of pulses, the width of which is determined by the relative position of the synchronizing pulses atop the peaks of the parabolic pulses. The plate current pulses are integrated in the cathode circuit. The cathode circuit includes a resistor which is common to the grid circuit of the blocking oscillator and this current controls the frequency of oscillation by varying the amount of time required for the grid-leak bias of the oscillator to decline to the point at which the oscillator tube becomes conductive. As stated in Grob, page 341, "the amplitude of the synchronizing pulses is critical in determining the amount of the control votage, and unless very good limiting is used for the sync, the scanning oscillator frequency may vary with changes of input signal level." Clark states the limitation of this prior art system in this manner, p. 499: "The synchronizing separator used with the pulse-time automatic frequency control system must be of a type that provides synchronizing pulses of constant amplitude. . . . If the synchronizing pulse amplitude is not maintained constant, the area of the effective portion of the synchronizing pulse will not contain the proper information and poor results will be obtained." Another important object of the present invention is to provide an automatic synchronizing control circuit which does not require constant-amplitude synchronizing pulses and also does not require special precautions such as very good limiting in preceding stages for preserving the constancy of that amplitude.

Another fundamental object of the invention is to provide a system for synchronizing television apparatus which utilizes plate circuit keying of a control tube and therefore has a higher degree of immunity to noise than that characteristic of prior art systems.

A further basic object of the present invention is to provide an automatic synchronizing control system which is rendered further insensitive to noise by the provision of grid circuit limiting.

Among the general objects of the present invention are: to provide an improved automatic synchronizing control system which is more effective in maintaining image detail, which is characterized by a higher signal-to-noise ratio than prior art devices, which has high gain, which is more effective in preserving the desired image raster structure in the face of electrical disturbances, which is more stable in its control than prior art devices, is economical in construction, and which overcomes the disadvantages and limitations which are attendant upon the use of prior art circuits such as those mentioned above.

For a better understanding of the present invention, together with other and further objects, advantages and capabilities thereof, reference is made to the following description of the accompanying drawings, in which there is shown an illustrative embodiment of automatic frequency control circuit in accordance with the invention.

Figure 2:
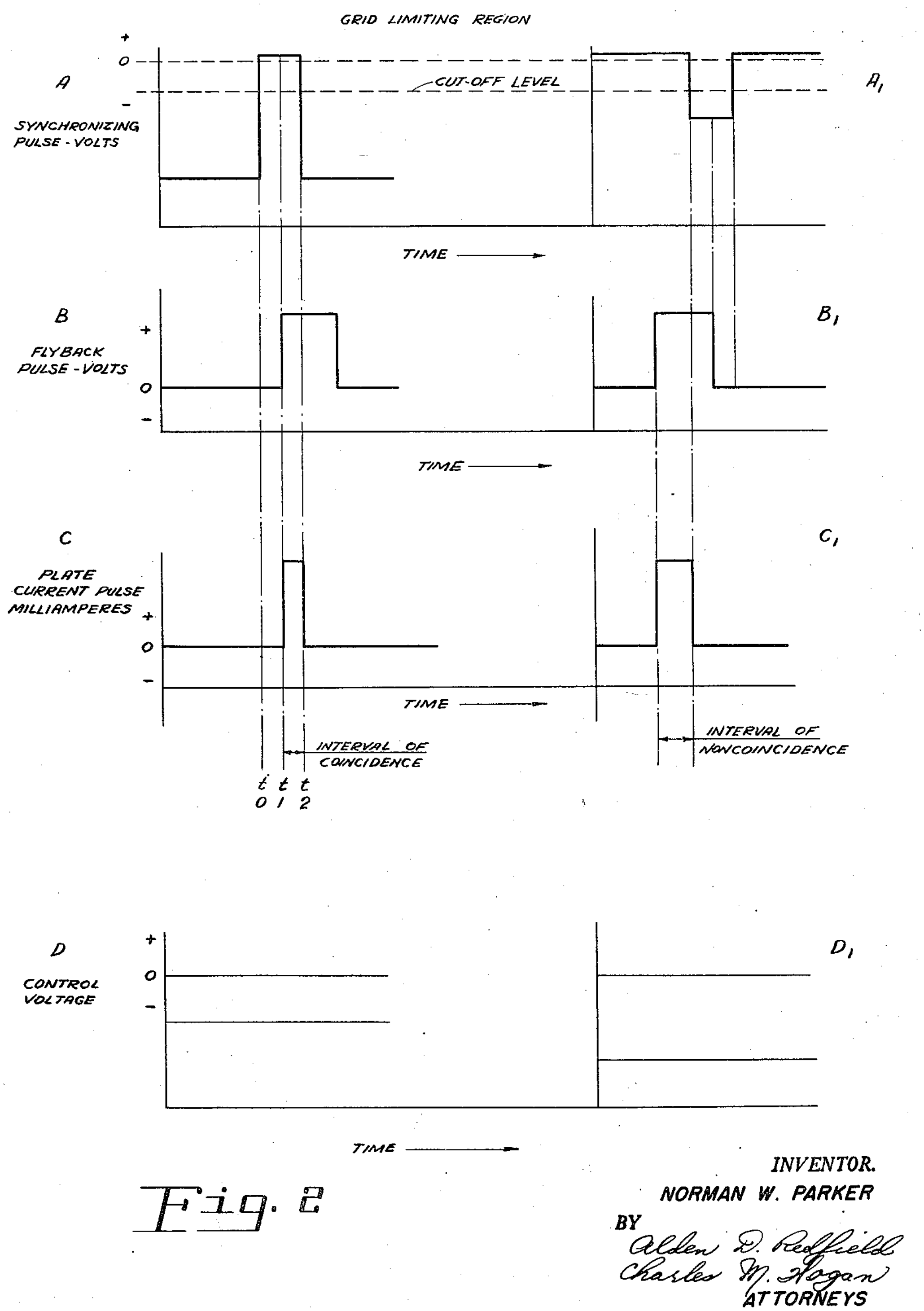

In the drawings:

Fig. 1 is a circuit diagram generally in schematic form of a television receiver including a preferred form of automatic frequency control (AFC) circuit in accordance with the invention;

Fig. 2 comprises two sets of curves employed in explaining the operation of the invention.

In accordance with one of the several appended claims to the preferred form of the invention, I provide an automatic frequency control circuit for a television picture tube deflecting system. The principal parts of this AFC circuit are shown within the dashed outline 11. The illustrative deflecting system here shown is of the type which comprises deflecting windings (such as 74, 75) and a signal generator (including the tubes 56 and 67) for generating deflection signals having a frequency at least in part determined by a control potential applied thereto (this potential being applied from the output of unit 11 to unit 12). The deflecting system also comprises means including a transformer (shown within the dashed outline 13) for coupling the generator to the deflecting windings, thereby to produce periodic beam-deflecting waves in the windings. The function of my novel AFC circuit is to provide the control potential which is applied to the signal generator tube 56. This AFC circuit comprises a combination which includes an electron tube 49 having at least anode, cathode, and control electrodes. I provide means including a winding 35 in the transformer unit 13 for applying to the anode-cathode circuit of said tube 49 flyback pulses of positive polarity. These pulses are developed during the beam retrace intervals, which occur at line frequency, and they key the tube 49 into conductivity. The tube 49 is made to function as a grid limiter by the provision of a series grid resistor 50. By coupling means 45, 46, 50 including this series grid resistor, horizontal synchronizing pulses are applied with positive polarity in the specific example shown to the control electrode of the tube 49. There is also provided means for normally biasing the tube to cut-off in the absence of the synchronizing pulses and flyback pulses. This means confines conductivity of the anode circuit of the tube to intervals of coincidence of corresponding ones of the synchronizing pulses and flyback pulses. This means is here shown as a battery 51. The tube so operates as to generate periodic control pulses, the energy content or width of which varies in accordance with the relative phases of the synchronizing pulses and the flyback pulses. These control pulses are integrated by a network 52, 53 to produce the control potential which is known as the AFC potential and is applied to the horizontal deflecting system 12 to control and synchronize the same. Other claims are directed to the combination of certain of the circuit elements shown within the dashed outline 11, this combination functioning to produce the control pulses. Particular attention is invited to these features as the detailed description proceeds.

My improved automatic frequency control system is shown as incorporated in a television receiver which may be regarded as conventional for the purposes of this case except in the respects hereinafter set forth. This illustrative receiver comprises a radio frequency amplifier stage 4 to which the input carrier signals are applied, and the following stages in cascade therewith: an oscillator modulator 5 for converting the received signals to intermediate frequency signals (it being understood that the units 4 and 5 are tunable to select a desired television broadcast channel), first and second intermediate-frequency amplifying stages 6, third and fourth intermediate-frequency amplifying stages 7, a video detector stage 8, and an output unit symbolically shown within the dashed outline 9. This receiver is of the intercarrier sound type, as shown and described in U. S. Patent 2,448,908 to Parker, and it will be understood that separation of the video and sound signals occurs within the output unit 9, which includes a video amplifier stage 16, a grounded-grid type D. C. restorer and sync separator tube 28 and a cathode ray picture tube 25.

The elements collectively indicated within the dashed outline 9 are purely conventional, as are likewise the units 4, 5, 6, 7 and 8, so that further description thereof is deemed unnecessary herein. Briefly, however, the detector output is coupled to the control electrode of video amplifier tube 16 as by parallel combination of an inductor 14 and a resistor 15. Tube 16 is provided with a cathode resistor 17. The screen of tube 16 is bypassed by a capacitor 18 and the anode is coupled through a series peaking circuit (comprising a parallel combination of an inductor 20 and a damping resistor 21) and a resonant circuit (comprising a parallel combination of an inductor 22 and a capacitor 23) and a coupling capacitor 24 to the grid of a cathode ray picture tube 25. The anode of the video amplifier has a load comprising a series combination of an inductor 26 and a resistor 27 leading to a source of space current (not shown). The symbol +B is used herein to indicate various anode potential sources, which need not be the same. The direct current reinserting circuit comprises a grounded-grid triode 28, having its cathode coupled to the lower end of coil 26 through a capacitor 29 and a resistor 30 and having its plate connected to one end of resistor 27 through a resistor 31. The cathode-anode circuit of triode 28 is shunted by a series combination of resistors 32 and 33. As is well known to those skilled in the art, a direct current component which is a measure of the over-all illumination appears at the cathode of tube 28 and is applied to the grid of the picture tube through a resistor 34. D. C. restorer networks of this general character are shown and described in a number of publications, including U. S. Patent 2,240,281 issued to R. C. Ballard on April 29, 1941.

Separation between video and sound signals occurs by reason of circuitry including element 22, a sound take-off resonant circuit (not shown) being magnetically coupled to inductor 22 as a primary. Tube 28 and the circuit elements immediately associated therewith separate the sync signal components from the video signal components. The plate circuit of tube 28 is coupled to a synchronizing signal amplifier unit of conventional character, illustrated within the dashed outline 10, as by a coupling capacitor 36.

The separated horizontal synchronizing signals are applied to the input of the novel automatic frequency control circuit provided in accordance with the present invention. The unit 10, which is per se conventional performs the function of amplifying the vertical and horizontal synchronizing signals and further separating them from the video signal components, preparatory to the application of the synchronizing pulses to my novel circuit, shown within the dashed outline 11. It will be understood that any suitable inter-sync separator or amplifier circuit may be provided in lieu of the circuit herein shown within the dashed outlines 10. This specific synchronizing signal amplifier circuit need not be described in detail. Briefly, however, it comprises a pair of triode tubes 37 and 38. The input circuit of tube 37 is coupled to the anode of the sync separator tube 28 as by a coupling network including a capacitor 36 and a grid resistor 44, and grid-rectification restoration of the D. C. component of the synchronizing signals occurs within unit 10. The D. C. restoration action also provides self-bias for tube 37. The anode of tube 37 is coupled to a suitable source of space current (not shown) through a resistor 41 and the anode of tube 38 is likewise connected to that source. The output circuit of tube 37 is coupled to the input circuit of tube 38 by a conventional resistance-capacitance coupling network comprising the elements 39 and 40. Tube 37, in addition to its amplifying function, being driven near cut-off by the peaks of negative input pulses, clips black or negative-going noise. Tube 38 functions as an impedance-transformation device or cathode follower. Included in its cathode circuit is a filter network comprising a parallel combination of resistor 42 and capacitor 43. This parallel combination is coupled as by a capacitor 45 and a grid resistor 46 to the input of my novel circuit 11 (i. e. to the grid circuit of tube 49). It is satisfactory for the composite horizontal and vertical synchronizing signals to be applied to the input of unit 11, as in the illustration herein shown, wherein the synchronizing pulses are of positive polarity as applied to tube 49, although the horizontal synchronizing pulses may be separated out as by differentiation and separately applied if desired. The conductor 47 from unit 10 is applied to a double integration network (not shown), for example, for purposes of separating out the vertical synchronizing pulses and the latter alone are utilized to control the vertical deflecting system (not shown).

An automatic gain control circuit 48 may optionally be used. The nature of this gain control device is not material to the description of the present invention. The details of a suitable device herein suggested by the block 48 and associated circuit connections are fully disclosed in the U. S. patent application of Parker and Wissel, entitled Automatic Gain Control, Serial No. 102,176, filed in the United States Patent Office, on June 30, 1949. Reference may be made to that application for a specific description of the automatic gain control herein suggested.

The units 9, 10 and 12, herein described briefly, are included in this disclosure in order to show: (1) the application of suitable synchronizing impulses to the input of my novel circuit 11; (2) the application of retrace pulses to my novel circuit 11; (3) the use of the direct current control potential provided by my novel circuit 11 to control the horizontal deflecting system included within the dashed outline 12.

The control tube 49 which is provided in accordance with the preferred form of the present invention is periodically keyed into conductivity by keying pulses which occur during the retrace intervals. These pulses are obtained from a winding 35 which is included in the horizontal output transformer assembly, shown within the rectangular dashed outline 13. The manner in which the retrace pulses are developed will be explained in some detail. It will be understood that the ultimate function of my novel automatic frequency control circuit, included within the dashed outline 11, is to apply to the horizontal deflecting system (shown within the dashed outline 12) a direct current control potential of such a magnitude as to maintain synchronism (i. e. a predetermined desired phase relationship between the synchronizing signals and the flyback pulses).

The horizontal deflecting system which is shown within the dashed outline 12 is conventional and need not be described in detail herein. Briefly, however, unit 12 comprises the following principal components: a blocking oscillator and discharge tube 56, a power output tube 67, a primary 70 and a secondary 71 of an output transformer, a damping tube 76, and the horizontal deflecting coils 74 and 75.

The blocking oscillator circuit comprises a triode 56, an autotransformer or inductor 57, arranged in a series combination with a capacitor 55 coupled between plate and grid, and a discharge capacitor 58 effectively connected between a tap on the auto-transformer and ground. A resonant circuit comprising a parallel combination of an inductor 59, a capacitor 60 and a damping resistor 61 is interposed between this tap and the high potential terminal of capacitor 58. Plate voltage is supplied to the blocking oscillator through a circuit comprising conductor 62, dropping resistor 63, tap 64, and a part of transformer 57. The sawtooth voltages employed for horizontal deflection are developed across discharge capacitor 58, tube 56 functioning not only as a blocking oscillator tube but also as a discharge tube. The blocking rate or frequency of oscillation of tube 56 is controlled by causing the discharge of capacitor 55 to reach the cut-off point at a variable time controlled by the AFC potential output of unit 11.

The discharge capacitor 58 is coupled, as by a capacitor 65 and a grid resistor 66 to the grid of a horizontal output amplifier tube 67, the latter being provided with a cathode resistor 68, bypassed by a capacitor 69. The output of this amplifier stage is coupled by a transformer network 70, 71 to the deflecting coils 74, 75 and the current waves appearing in the plate circuit of this amplifier tube are employed to produce periodically recurring sawtooth currents of line frequency in these coils, thereby to deflect the electronic beam in the picture tube at line-frequency.

The system intercoupling the horizontal output tube and the deflection yoke will be understood by reference to the following patents and publications: Kiver, Television Simplified, pages 207–213, Second Edition, 1948, D. Van Nostrand, Inc., New York; U. S. Patent No. 2,440,418, Tourshou. Reference to those publications is made for a detailed description of the network. Briefly, the primary 70 of the horizontal output transformer is magnetically coupled to a secondary 71 comprising series portions 72 and 73, of which portion 73 is coupled across the horizontal deflecting coils 74, 75 of the yoke circuit. These coils form part of a yoke assembly (not shown) encircling the neck of the cathode ray image reproducing tube 25.

The voltage variations applied to the control electrode of power tube 67 produce a rising plate current in this tube during scansion, which current is cut off at the beginning of retrace time. The current in the deflection coils 74, 75 and the horizontal output transformer does not disappear at the instant of cut-off of tube 67, however, due to the inherent distributed capacity of the circuit. The inductance of these coils and the transformer, together with the above-mentioned distributed capacity, forms a tuned circuit in which high frequency oscillations would normally be produced. These oscillations begin with the start of retrace time and continue for one-half of the normal period of oscillation, the oscillation being stopped at the negative current peak by a series combination of a diode 76 and a capacitor 77 connected across the secondary 71. The polarities immediately following retrace are such that damper tube 76 conducts and continues to conduct until tube 67 again becomes conductive. The voltage developed across capacitor 77 is such as to increase or boost the voltage of the D. C. power source (not shown), connected to terminal 78. It will be noted that the anode potential supply for tube 56 is completed to this terminal 78 through a circuit comprising resistor 79 and line 62.

The primary winding of the horizontal output transformer is connected to a capacitor 81 in such a manner that a varying voltage is developed across capacitor 81, which voltage is applied to capacitor 77 through an inductor 82 for purposes of linearity control, as explained in the aforementioned Tourshou patent.

For purposes of width control, there is connected in shunt with portion of secondary an inductor 83. The operation of the width-control is well known to those skilled in the art and is considered in such publications as U. S. Patent 2,449,969 to Anthony Wright.

When the quick collapse of plate current through tube 67 occurs, at the end of trace, there is produced across winding 70, by reason of self-induction, a high voltage pulse. One of pulses occurs during each retrace interval. They are known as "flyback pulses" and they occur at line-deflection rate.

The elements beginning with the reference numeral 56 and ending with the reference numeral 83 are herein shown for the purpose of disclosing an illustrative source of flyback or keying or retrace or deflection-rate pulses employed in the automatic frequency control system in accordance with the invention. The retrace pulse source designated by the reference numerals beginning with 56 and ending with 83, such elements being shown within the dashed outline 12, is illustrative, and other arrangements for deriving deflection-rate or retrace pulses from the horizontal deflecting system may be employed within the scope of the claims appended hereto.

My novel AFC circuit comprises a tube 49, here illustratively shown as a triode, having grid 90, cathode 91 and anode 92 electrodes. Means comprising a coupling capacitor 45, a series resistor 50 and a grid resistor 46, the latter being connected between ground and the junction of elements 45, 50, is provided for applying the horizontal synchronizing or composite synchronizing pulses from the output of unit 10 to the grid-cathode circuit of tube 49. Biasing means, here shown as a battery 51 in the cathode circuit with positive terminal connected to cathode, is provided for rendering the tube 49 nonconductive in the absence of synchronizing pulses, even when positive keying pulses are applied to its anode circuit. This biasing means renders the cathode normally positive relative to the grid. The grid-cathode circuit is employed as a limiter circuit by the insertion of series resistor 50, which is very large compared to the grid-to-cathode resistance when grid current flows. Applied positive pulses at the grid must drive the grid positive by an amount equal to the value of the bias (imposed by battery 51) before the biasing effect is overcome. A further rise in the input voltage produces grid current which results in limiting the voltage at the grid. The series resistor 50 prevents the grid from going appreciably above the cathode potential. The grid-to-cathode resistance drops from an infinite value, when the grid is negative relative to the cathode, to a small value, say on the order of 1000 ohms, when the grid attempts to become positive relative to the cathode. When a series resistor 50 on the order of, say, 100,000 ohms, is placed in series with the grid, the drop across the grid-cathode resistance is negligible compared to that which is developed across the resistor 50.

Assuming application of the keying pulses to the plate, the tube 49 is biased to cut-off at a level preferably at or slightly above the pedestal height and below the peaks of the superimposed synchronizing pulse signals. When a synchronizing signal pulse is applied to tube 49 the grid attempts to swing positive, but grid current flows through the resistor 50, developing a voltage drop of such polarity as to oppose the positive input voltage. Since the full input voltage is the sum of the drop across resistor 50 and the drop across the grid-cathode resistance, the larger resistor 50 is with respect to the grid-cathode resistance, the more nearly the voltage on the grid is limited to that of the cathode. This drop across resistor 50 may be considered as an automatic bias developed during the synchronizing signal pulse intervals.

The grid circuit of tube 49 causes the tube to function not only as an amplifier but also as a limiter, so that two significant advantages accrue: First, my AFC circuit is not dependent on a critical predetermined amplitude of the applied synchronizing pulses, since it performs its own limiting function; second, my AFC circuit, as herein shown in detail, possesses a high degree of immunity to "black noise" superimposed on the synchronizing signal pulses, such noise pulses being removed by the limiting action.

Another significant advantage of my AFC circuit is that the control tube is keyed into conductivity at the plate circuit, the data pulses from the synchronizing signal unit 10 and the flyback pulses from the output of the horizontal deflecting circuit being separately applied to the grid and plate circuits, respectively. Since the tube 49 is conductive only during intervals of coincidence between horizontal sync pulses and flyback pulses, it is not responsive to vertical pulses or video information, so that composite horizontal and vertical sync may be applied to unit 11. For the purpose of providing keying pulses there is provided an additional winding 35 in the output transformer unit 13, magnetically coupled to primary 70 and secondary 71.

One portion 94 of this winding is in series with an integrating circuit comprising a resistor 52 and capacitor 53. The elements 52 and 53 are connected in parallel between one terminal (i. e. the center tap) of portion 94 (of winding) and ground. The other terminal of portion 94 is connected to anode 92 of tube 49. The input admittance of tube 49 is neutralized by a capacitor 96 which couples the plate and grid circuits of tube 49 in such a way that the current passing through it is of the proper amplitude and phase to neutralize the effect of the current flowing between the plate and grid circuits of tube 49 via the grid-plate capacitance. The voltage at the end of winding portion 95, connected to capacitor 96, is in phase opposition to the voltage at the end of winding portion 94, connected to the plate of tube 49. The voltage across the neutralizing inductance 95 causes the grid of tube 49, connected to capacitor 96, to receive a current which neutralizes energy transfer through the tube capacitance, according to principles explained by Terman, Radio Engineering, pp. 367 et seq., third edition, 1947, McGraw-Hill Book Co., Inc., New York, New York.

Winding portion 94, being in series with the plate circuit of tube 49, serves as the immediate source of positive flyback pulses (developed during retrace), of line frequency, which periodically key triode 49 into conductivity. This tube plate-rectifies into the time constant integrating network comprising resistor 52 and capacitor 53.

The time constant of this network 52, 53 must be long compared to the interval between flyback pulses. This network functions as a low pass filter which preferably should pass frequencies on the order of 30 cycles or less. Connected across the integrating network is a series combination of resistor 98 and a capacitor 99, which functions as an anti-hunting circuit. The anti-hunt circuit comprising resistor 98 and capacitor 99 is proportioned in the following illustrative manner: the capacitor 53 is fed from an effective source impedance which includes the resistor 52 in parallel with the output impedance of tube 49. In order to reduce the gain of the feedback loop at high frequencies without substantially reducing it at low frequencies, the series resistor capacitor combination 98, 99 is connected across capacitor 53. When the capacitor 99 is proportioned to be much larger than the capacitor 53, the resistor 98 can be so determined in value as to reduce the gain to such an extent as to prevent hunting. This combination of resistor 98 and capacitor 99 reduces the tendency of the circuit to oscillate and effectively prevents undesired oscillation because it reduces the alternating current gain in the region of natural resonance of the loop circuit, it being understood that all systems of automatic frequency control which depend upon the derivation of a control signal from signals corresponding to order and response are inherently capable of oscillation and will oscillate at the natural resonance frequency unless precautions are taken to suppress such oscillations. The theory of anti-hunting networks such as that which comprises elements 98, 99 is well known to the art and need not be further described herein. The grid circuit of the blocking oscillator tube 56, which includes capacity 55, is completed by the series combination of grid resistor 100 and resistor 52, resistor 100 being connected between the grid of tube 56 and the junction of the integrating network 52, 53, and resistor 98. The anti-hunting network may also be regarded as an error-rate circuit, as explained in columns 2 and 3, page 60, Radio and Television News, January 1950, vol. 43, No. 1, published by Ziff-Davis Publishing Co., 185 No. Wabash Avenue, Chicago 1, Illinois.

While I do not desire to be unduly limited to any specific set of circuit parameters, the following parameters which have been found to be entirely satisfactory are submitted by way of illustration and not by limitation:

Tube 38, one-half section of Type 6SN7, or 6J5
Resistor 42, 6800 ohms
Capacitor 43, 20 micromicrofarads
Capacitor 45, .01 microfarad
Resistor 46, 10,000 ohms
Resistor 50, 100,000 ohms
Tube 49, one-half section of Type 6SN7, or 6J5
Capacitor 96, 1–5 micromicrofarads
Resistor 52, 150,000 ohms
Capacitor 53, .02 microfarad
Resistor 98, 10,000 ohms
Capacitor 99, .25 microfarad
Resistor 100, 470,000 ohms
Tube 56, one-half section of Type 6SN7, or 6J5

Coming now to the operation of the invention, it will be assumed that synchronizing pulses of line frequency and of positive polarity are applied to the grid circuit of tube 49. These pulses are as represented by curve A, in Fig. 2. It will also be assumed that flyback pulses of positive polarity are applied to the plate circuit of tube 49. These pulses are ideally represented by curve B of Fig. 2, although it will be understood that in actual practice the keying pulses are actually curved at the top. The grid circuit of tube 49 is so biased by source 51 that only the superimposed synchronizing pulses are in the conductive region. In the specific embodiment illustrated wherein positive pulses are applied to the grid of tube 49, the blocking oscillator has a free running frequency which is greater than that of the synchronizing pulses, i. e., greater than line-frequency. In the absence of an AFC output from unit 11, in other words, this blocking oscillator would tend to run at a more rapid rate than deflection rate. A negative control potential is therefore required to effect synchronism and the condition necessary to accomplish this result is that the initiation of the keying pulse occur at or later than the initiation of the synchronizing pulse. This is shown in the curves in Fig. 2, $t_0$ being the instant of initiation of a synchronizing pulse and $t_1$ being the instant of an initiation of a keying pulse. Between instants $t_1$ and $t_2$, the latter being the instant at which the synchronizing pulse ceases or terminates, the synchronizing pulse and the corresponding keying pulse are coincident, and the interval between $t_1$ and $t_2$ is known as the interval of coincidence. The difference between order and response, i. e., the difference between the phase of the synchronizing signals and the phase of the flyback signals is functionally related to and proportional to the time of coincidence. The resultant output plate current pulse of tube 49, as shown in curve C of Fig. 2, has a total energy content or width or duration which is dependent on the interval of coincidence. The energy content of this pulse is therefore a measure of the amount by which the flyback pulses follow the synchronizing pulses in phase. Being a measure of that deviation, it is also a measure of the corrective potential which is required, when applied to the blocking oscillator tube 56, to restore phase coincidence. When the flyback pulses are in rate-synchronism with the synchronizing pulses, each current pulse C assumes a predetermined value, there being a predetermined phase displacement between the two types of pulses.

The direct current potential which is applied to the grid circuit of tube 56 is obtained by integrating or averaging a large number of current pulses such as those shown in curve C of Fig. 2, this function being performed by the integrating network 52, 53 into which tube 49 plate rectifies. The function of the integrating network is to convert a plurality of such pulses into a relatively steady control potential illustrated by the curve D (Fig. 2).

Under normal conditions the blocking oscillator tube becomes conductive at a time slightly later than the arrival of a synchronizing pulse and therefore a certain bias is normally developed across the integrating network 52, 53. This value corresponds to that for which the frequency of the blocking oscillator is equal to the frequency of the synchronizing signals and the two signals are therefore substantially in synchronism and in the desired phase relationship. The system is controlled for the reason that if the blocking oscillator tends to accelerate there is a decrease in the phase difference between the synchronizing signals and the flyback signals and the intervals of coincidence and the plate current pulses of tube 49 increase in duration. The bias developed by the integrating network 52, 53 also increases, becomes more negative and therefore reduces the frequency of the blocking oscillator until synchronism is restored. Conversely, if the blocking oscillator tends to slow down, the above-mentioned phase difference increases and the periods of coincidence decrease so that the AFC control potential applied to tube 56 also decreases, with the effect that the frequency of the blocking oscillator increases in such a way as to restore synchronism.

It will be observed that tube 49 is essentially a sampling device. It is keyed into conductivity by each flyback pulses in order to sample that portion of the corresponding synchronizing pulse which is coincident with the keying pulse. The AFC control potential is not a function of one sampling operation but in fact is a function of a plurality of sampling operations, so that the circuit enjoys the advantages of indirect synchronization and the immunity to noise which characterizes AFC devices which are energy-responsive rather than amplitude responsive. The circuit enjoys a further immunity from noise in that the advantages of limiting are achieved, the grid circuit of tube 49 being so arranged, particularly by virtue of the presence of series resistor 50, as to cut off any noise pulses which may be superimposed on the synchronizing pulses. A still further immunity from noise is insured by reason of the fact that the tube 49 is plate keyed into operation and is conductive only during the intervals of coincidence. The tube is so biased by the source 51 that it is not conductive, even in the presence of plate keying pulses of positive polarity, unless synchronizing pulses are also applied to its grid. Since the tube is conductive only during periods of coincidence of these two distinct types of pulses, separately applied to its grid and plate circuits, it is entirely immune from noise during all other periods.

Being a triode tube or equivalent, tube 49 affords high gain and does not require any D. C. amplifier. In the specific example just described, a negative AFC potential is developed during synchronism, the natural free running period of the blocking oscillator being such that the frequency of its output pulses tends to be greater than the frequency of the synchronizing pulses.

When the specific system herein disclosed is in synchronism a negative AFC potential of a predetermined value is applied to blocking oscillator 56 by unit 11. The system operates in such a way that when there is a departure from synchronism caused by a slowing down of the blocking oscillator the intervals of coincidence decrease and the control potential becomes less negative. When an increasing negative potential is required to bring an oscillator from a free-running condition into synchronism it follows that the natural free-running frequency of the oscillator is higher than that of the synchronizing signals. Therefore, when synchronizing signals of positive polarity are applied to the grid circuit of tube 49, the constants of the blocking oscillator circuit (tube 56 and associated elements) are so determined that the free running frequency of the oscillator is higher than the horizontal line frequency. This results in an additional advantage in that, when the receiver is de-tuned from an available signal channel, the blocking oscillator 56 can be designed to run at a frequency above the audible frequency range, so that it does not constitute a source of audible interference.

It will of course be understood that it is within the spirit of the present invention and the scope of the claims appended hereto to employ any type of deflection generator and the invention is not limited to utility with a blocking oscillator such as that shown herein but may be used with any deflection signal generator of the type which is controlled as to frequency as by a direct current potential, for example, a multivibrator. When a multivibrator of the tube which is controlled by a negative control potential is employed and when synchronizing signals of positive polarity are applied to the control tube 49 then the constants of the multivibrator circuit must be such as to give it a free-running natural frequency greater than the frequency of the horizontal synchronizing signals.

It will further be understood that the composite synchronizing signals inclusive of both horizontal and vertical signals may be applied to the tube 49, because the tube is so biased that it is conductive only during the above-mentioned intervals of coincidence, and it has the advantage, therefore, of not being responsive to the vertical synchronizing signal components of the composite signal. Therefore, there is no necessity to precede tube 49 by circuits which entirely remove vertical information from the horizontal synchronizing signals. The tube being plate keyed, and conductive only during the intervals of coincidence, it is not affected by any video content which may pass through the units 9 and 10 and be applied to the tube 49.

The embodiment hereinabove described in detail so operates as to develop periodic plate pulses in tube 49 which increases in width as synchronism is approached. In other words, each retrace pulse keys the tube 49 into conductivity during that part of the corresponding synchronizing pulse interval which coincides in time with the retrace pulse. In effect, the tube 49 "samples" the width of the synchronizing pulse during the period of coincidence.

In this system the control potential becomes more negative as synchronism is approached and therefore the blocking oscillator has a free-running frequency greater than line-frequency.

The invention also contemplates the reverse operation wherein the synchronizing pulses are applied to the control tube (such as 49) with negative polarity. In that case the control potential becomes less negative as synchronism is approached and a blocking oscillator having a free-running frequency less than line-frequency is employed. These conditions are illustrated in Fig. 2 (right-hand side), curve $A_1$, showing a sync pulse, curve $B_1$, the corresponding retrace pulse, curve $C_1$, the resultant periodic plate pulse of tube 49 and curve $D_1$ the D. C. control potential. The control tube is then so biased that the synchronizing pulses cut off the tube, which is conductive only during that portion of a positive plate-pulse interval which is not coincident with the corresponding synchronizing pulse interval. Such a system "samples" the width of the retrace pulse during the period of non-coincidence. As coincidence increases, in such a system, the width of the plate pulse decreases and the control potential becomes less negative. Black noise superimposed on the synchronizing pulses is clipped in this system because the synchronizing peaks extend to or beyond the cut-off region. Grid circuit limiting is not then provided and vertical synchronizing signals must be separated out before application of horizontal synchronizing pulses to the controlled tube.

While there has been shown and described what is at present considered to be the preferred embodiment of the present invention, it will be obvious to those skilled in the art that various changes and modifications may be made within the teachings of the invention and the true scope of the appended claims.

Having thus described my invention, I claim:

1. An automatic frequency control circuit, for use in an indirectly synchronized horizontal beam-deflecting system of a television receiver—said system being of the type which comprises magnetic deflecting windings, a blocking-oscillator for generating deflection signals and operating at a frequency at least in part determined by a unidirectional negative control potential having a magnitude dependent on the extent of deviation from synchronism, and electron-beam deflecting means including a transformer for coupling said generator to said deflecting windings whereby to produce periodic beam-deflecting waves therein—comprising the combination of an electron tube having at least anode, cathode, and control electrodes, means including a winding in said transformer for applying to the anode-cathode circuit of said tube flyback pulses of positive polarity developed during beam retrace intervals, thereby to key said tube into conductivity, means including a series grid-limiting resistor for applying horizontal synchronizing pulses with positive polarity to said control electrode, means for normally biasing said tube to cut-off except during intervals of time coincidence between said fly-back pulses and said synchronizing pulses, whereby said tube generates periodic resultant pulses, the energy content of which varies with the phase difference between corresponding ones of said flyback pulses and said synchronizing pulses, means in circuit with said anode for integrating said resultant pulses into said negative control potential, and means for applying said potential to said blocking-oscillator to maintain synchronism, said blocking-oscillator having a free running frequency greater than that of said synchronizing pulses so that the development of some control potential is required to maintain synchronism.

2. An automatic frequency control circuit for an indirectly synchronized television picture tube deflecting system—said system being of the type which comprises beam-deflecting elements and a signal generator for generating deflection signals having a frequency at least in part determined by a control potential, and means for coupling said generator to said deflecting elements whereby to produce periodic beam-deflecting signals—comprising the combination of a normally nonconductive electron tube having at least anode, cathode, and control electrodes, means for applying to the anode of said tube retrace pulses of positive polarity, thereby to key said tube into conductivity, means for applying horizontal synchronizing pulses of positive polarity to said contol electrode, whereby said tube generates periodic resultant pulses, the energy content of which varies with the relative phases of said synchronizing pulses and said retrace pulses, means for integrating said resultant pulses into said control potential, and means for applying said potential to said generator to maintain synchronism.

3. In an automatic frequency control circuit for an indirectly synchronized picture tube deflecting system—said system being of the type which comprises deflecting windings and a signal generator for generating a deflection signal having a frequency at least in part determined by a control potential applied thereto, electron-beam deflecting means including a transformer for coupling said generator to said deflecting windings whereby to produce periodic beam-deflecting waves therein, means for integrating said periodic pulses into said control potential, means for applying said control potential to said signal generator to maintain synchronism, and a source of horizontal synchronizing signals of positive polarity—the improvement which resides in a novel circuit for generating said periodic pulses comprising the combination of an electron tube having at least anode, cathode, and control electrodes, means including a winding in said transformer for applying positive keying pulses at deflection rate to the anode-cathode circuit of said tube, means for applying said synchronizing pulses to the control electrode-cathode circuit of said tube, and means for biasing said tube to cut-off except during periods of coincidence of corresponding ones of said synchronizing pulses and said keying pulses.

4. In an automatic frequency control circuit for an indirectly synchronized picture tube deflecting system—said system being of the type which comprises deflecting elements and a signal generator for generating a deflection signal having a frequency at least in part determined by a control potential applied thereto, electron-beam deflecting means for coupling said generator to said elements whereby to produce periodic beam-deflecting signals thereat, means for integrating periodic pulses into said control potential, means for applying said control potential to said signal generator to maintain synchronism, and a source of horizontal synchronizing signals of positive polarity—the improvement which resides in a novel circuit for generating said periodic pulses comprising the combination of an electron tube having at least anode, cathode, and control electrodes, means for applying positive keying pulses at deflection rate to the anode-cathode circuit of said tube, means including a coupling capacitor and a shunt resistor and a series grid-current limiting resistor for applying said synchronizing pulses to the control electrode-cathode circuit of said tube, and means for biasing said tube to cut-off except during periods of coincidence or corresponding ones of said synchronizing pulses and said keying pulses.

5. In a television receiver AFC system, a circuit for generating periodic control pulses comprising, in combination, a source of positive retrace pulses, a source of synchronizing pulses, a single tube having at least anode and cathode and control electrodes, means for applying said positive retrace pulses to the anode-cathode circuit of said tube, and means for applying said synchronizing pulses to the cathode-control electrode circuit of said tube.

6. In a television receiver AFC system, a circuit for generating periodic pulses having a duration proportional to the phase displacement between synchronizing pulses and deflection-rate pulses comprising, in combination, a source of positive deflection-rate pulses, a source of synchronizing pulses, a single tube having at least anode and cathode and control electrodes, means for applying said positive deflection-rate pulses to the anode-cathode circuit of said tube, and means for applying said synchronizing pulses to the cathode-control electrode circuit of said tube.

7. In a television receiver AFC system, a circuit for generating periodic pulses having a time duration proportional to the phase displacement between synchronizing pulses and deflection-rate pulses comprising, in combination, a source of positive deflection-rate pulses, a source of positive synchronizing pulses, a tube having at least anode and cathode and control electrodes, means for applying said positive deflection-rate pulses to the anode-cathode circuit of said tube, and means for applying said positive synchronizing pulses to the cathode-control electrode circuit of said tube.

8. In a television receiver AFC system, a circuit for generating periodic pulses having a width proportional to the phase displacement between synchronizing pulses and deflection-rate pulses comprising, in combination, a source of positive deflection-rate pulses, a source of positive synchronizing pulses, a single limiter-amplifier tube having at least anode and cathode and control electrodes, means for applying said positive deflection-rate pulses to the anode-cathode circuit of said tube, and means including a series control electrode-current limiting resistor for applying said synchronizing pulses to the cathode-control electrode circuit of said tube.

9. In a television receiver AFC system, a circircuit for generating periodic pulses having an energy content proportional to the phase displacement between synchronizing pulses and deflection-rate pulses comprising, in combination, a source of positive deflection-rate pulses, a source of positive synchronizing pulses, a vacuum tube having at least anode and cathode and control electrodes, means for applying said positive deflection-rate pulses to the anode-cathode circuit of said tube, means for applying said synchronizing pulses to the cathode-control electrode circuit of said tube, and biasing means for confining conductivity of the anode-cathode circuit of said tube to periods of coincidence of corresponding ones of said synchronizing pulses and said deflection-rate pulses.

10. In a television receiver horizontal AFC system, a circuit for generating periodic pulses having an energy content proportional to the phase displacement between synchronizing pulses and line-frequency keying pulses comprising, in combination, a source of positive keying pulses, a source of positive synchronizing pulses, a single limiter-amplifier tube having at least anode and cathode and control electrodes, means for applying said positive keying pulses to the anode-cathode circuit of said tube, means for applying said synchronizing pulses to the cathode-control electrode circuit of said tube.

11. In a television receiver AFC system, a circuit for generating periodic pulses having an energy content proportional to the phase displacement between synchronizing pulses and line-frequency pulses comprising, in combination, a source of positive line-frequency pulses, a source of negative synchronizing pulses, a tube having at least anode and cathode and control electrodes, means for applying said line-frequency pulses to the anode-cathode circuit of said tube, means for applying said synchronizing pulses to the cathode-control electrode circuit of said tube, and biasing means for confining conductivity of said tube to those portions of the line-frequency pulse intervals which are not coincident with said synchronizing pulses.

12. In a television receiver AFC system, a circuit for generating periodic pulses having an energy content proportional to the phase displacement between synchronizing pulses and keying pulses comprising, in combination, a source of positive keying pulses, a source of synchronizing pulses, a vacuum tube having at least anode and cathode and control electrode, and means for separately applying said keying pulses and said synchronizing pulses to the output and input circuits of said tube.

13. In a television receiver, the combination of a line-deflecting system of the type which is frequency-controlled by a unidirectional control potential, and a control circuit for developing said potential, said control circuit comprising a vacuum tube having at least anode, cathode, and control electrodes, means coupling an output circuit of said line-deflecting system to the anode circuit of said tube to periodically apply positive keying pulses to said anode, means for applying synchronizing pulses to the input circuit of said tube comprised of said cathode and control electrode, means for rendering said tube nonconductive except during each interval of coincidence of a keying pulse and a synchronizing pulse, whereby said tube generates resultant periodic pulses, means for integrating said resultant pulses into said control potential representative of the phase difference between said synchronizing pulses and said keying pulses, and means for applying said potential to said line-deflecting system to stabilize said phase difference.

14. In a television receiver, the combination of a line-deflecting system of the type including a blocking oscillator which has a free-running frequency greater than the frequency at synchronism and is frequency-controlled by a negative unidirectional control potential, and a control circuit for developing said potential, said control circuit comprising a grid-circuit limiter including a vacuum tube having at least anode, cathode, and control electrodes, means coupling an output circuit of said line deflecting system to the anode circuit of said tube to periodically apply positive keying pulses to said anode, means for applying positive synchronizing pulses to the input circuit of said tube comprised of said cathode and control electrode, means for rendering said tube nonconductive except during each interval of coincidence of a keying pulse and a synchronizing pulse, whereby said tube generates resultant periodic pulses, means for integrating said resultant pulses into said control potential representative of the phase difference between said synchronizing pulses and said control pulses, and means for applying said potential to said blocking oscillator to stabilize said phase difference.

NORMAN W. PARKER.

REFERENCES CITED

The following references are of record in the file of this patent:

UNITED STATES PATENTS

| Number | Name | Date |
|---|---|---|
| 2,248,549 | Schlesinger | July 8, 1941 |
| 2,250,708 | Herz | July 29, 1941 |
| 2,288,025 | Pomeroy | June 30, 1942 |
| 2,335,265 | Dodington | Nov. 30, 1943 |
| 2,492,090 | Bass | Dec. 20, 1949 |
| 2,521,058 | Goldberg | Sept. 5, 1950 |

FOREIGN PATENTS

| Number | Country | Date |
|---|---|---|
| 479,874 | Great Britain | Feb. 14, 1938 |